United States Patent

Tardoskegyi

[15] 3,705,457

[45] Dec. 12, 1972

[54] WAVE SOLDERING USING INERT GAS TO PROTECT PRETINNED AND SOLDERED SURFACES OF RELATIVELY FLAT WORKPIECES

[72] Inventor: Louis V. Tardoskegyi, Montreal, Quebec, Canada

[73] Assignee: Electrovert Manufacturing Co., Ltd., Montreal, Quebec, Canada

[22] Filed: Nov. 2, 1970

[21] Appl. No.: 86,181

[52] U.S. Cl. ................... 29/494, 29/503, 117/51, 118/72, 228/36, 228/37
[51] Int. Cl. .................. B23k 31/02, B23k 35/38
[58] Field of Search ....... 29/494, 503, 471.1; 228/36, 228/37; 117/51, 54, 113, 114; 118/400, 72, 74

[56] References Cited

UNITED STATES PATENTS

| | | | |
|---|---|---|---|
| 2,591,926 | 4/1952 | Gibson et al. | 29/494 X |
| 2,870,532 | 1/1959 | Young | 29/503 X |
| 3,190,527 | 6/1965 | Tardoskegyi | 228/37 |
| 3,198,414 | 8/1965 | Tardoskegyi | 228/37 |
| 3,452,916 | 7/1969 | Andis | 228/36 |

*Primary Examiner*—John F. Campbell
*Assistant Examiner*—R. Craig
*Attorney*—McGlew & Toren

[57] ABSTRACT

Relatively flat workpieces, such as printed circuit boards, are pretinned and soldered using the wave solder technique in which molten solder is forced upwardly through a nozzle to form a standing wave of molten solder which is gently curved in a direction parallel to the work travel direction. A flat workpiece is moved in the work travel direction with its undersurface in contact with the standing wave and, as its forward end emerges from the wave, it defines, with the surface of the wave, a space. Inert gas under pressure is supplied to this space to exclude air from the solder coated undersurface of the workpiece to inhibit oxidation thereof. The disclosure apparatus includes a nozzle for forming a one-sided standing wave, and a second nozzle is positioned above and extends in the same direction as the solder wave-forming nozzle. The second nozzle is supplied with the inert gas under pressure to be discharged over the surface of the standing wave of solder, with the inert gas flowing over the undersurface of the workpiece and exiting at the side edges thereof.

11 Claims, 3 Drawing Figures

PATENTED DEC 12 1972  3,705,457

INVENTOR.
LOUIS V. TARDOSKEGYI
BY
McGlew & Toren
ATTORNEYS

WAVE SOLDERING USING INERT GAS TO PROTECT PRETINNED AND SOLDERED SURFACES OF RELATIVELY FLAT WORKPIECES

BACKGROUND OF THE INVENTION

A known technique for fluxing, pretinning and soldering relatively flat workpieces, such as printed circuit boards, comprises moving the boards along a path of travel in contact with a standing wave of the coating material, such as flux or molten solder. The standing wave is produced by forcing molten solder to flow upwardly through a nozzle to overflow at the upper end of the nozzle to form either a single-sided or a double-sided standing wave of molten solder, with the molten solder being returned to a solder tank for recirculation. When a single-sided standing wave is used, it is usually directed in a direction opposite to the direction of travel of the workpieces.

One of the problems encountered with wave soldering is that of protecting the exposed surface of the solder from oxidation and other contamination. Various solutions have been proposed, including applying a thin film of oil over the exposed surface of the molten solder wave, this film also adhering to the tin or solder coatings on the workpieces. However, due to the relatively high temperatures involved, there is a further problem with respect to oxidation and other degradation of the oil.

SUMMARY OF THE INVENTION

This invention relates to the pretinning and soldering of relatively flat workpieces, such as printed circuit boards, and, more particularly, to a novel and improved method and apparatus for such pretinning and soldering and in which an inert gas under pressure is applied to the surface of the molten solder and to the coated surfaces of the workpieces to exclude air and thus inhibit oxidation.

In the invention method, molten solder is forced upwardly through a nozzle to overflow at its upper end to form a one-sided standing wave of molten solder having an upper surface which is gently curved at a direction parallel to the work travel direction, the wave extending opposite to such direction of travel. During movement of a substantially flat workpiece in the work travel direction, with its undersurface in contact with the standing wave, an inert gas under pressure is supplied to the space defined between the surface of the wave and the workpiece undersurface leaving the wave. This inert gas excludes air from the solder coated undersurface of the workpiece, and from the exposed surface of the standing wave of solder, to inhibit oxidation. The inert gas covers the solder wave and the undersurface of the workpiece, and exits all over the front and side edges of the workpiece.

The apparatus for practicing the method of the invention includes a solder tank for containing molten solder and having a horizontal partition substantially midway of its height. A relatively elongated narrow nozzle extends upwardly from an opening in this partition and slopes forwardly in a direction opposite to the direction of work travel. A motor driven pump has an impeller disposed in another opening in the partition, and creates pressure beneath the partition to force molten solder to flow upwardly through the nozzle to form a one-sided standing wave which overflows back into the molten solder tank for recirculation. Suitable conveyor means or support rails are provided for movement of workpieces in contact with the standing wave of molten solder.

The upper wall of the solder nozzle forms a lower wall of an inert gas nozzle which discharges in the same direction as the direction of discharge of molten solder from the nozzle, so that, in effect, the inert gas is directed over the upper rear surface of the standing wave of molten solder. The inert gas is supplied to the inert gas nozzle through a conduit extending across the nozzle and formed with a series of relatively closely spaced apertures, this conduit being connected, preferably midway of its length, to a source of inert gas under pressure. As stated, the inert gas covers the exposed surface of the standing wave of molten solder and the coated surfaces of the workpiece to exclude air and inhibit oxidation, the inert gas flowing over the undersurface of the workpiece and exiting around the side and leading edges of the workpiece.

An object of the invention is to provide an improved method of pretinning and soldering relatively flat workpieces such as printed circuit boards.

Another object of the invention is to provide improved wave soldering apparatus for pretinning and soldering such relatively flat workpieces.

A further object of the invention is to provide such a method and apparatus in which inert gas under pressure is used to exclude air from the surface of the standing wave of molten solder and from the coated undersurface of a workpiece, to inhibit oxidation.

Another object of the invention is to provide such a method and apparatus which are inexpensive to operate and construct and which are efficient in operation.

For an understanding of the principles of the invention, reference is made to the following description of a typical embodiment thereof as illustrated in the accompanying drawing.

DESCRIPTION OF THE PREFERRED EMBODIMENT

Figure 1:
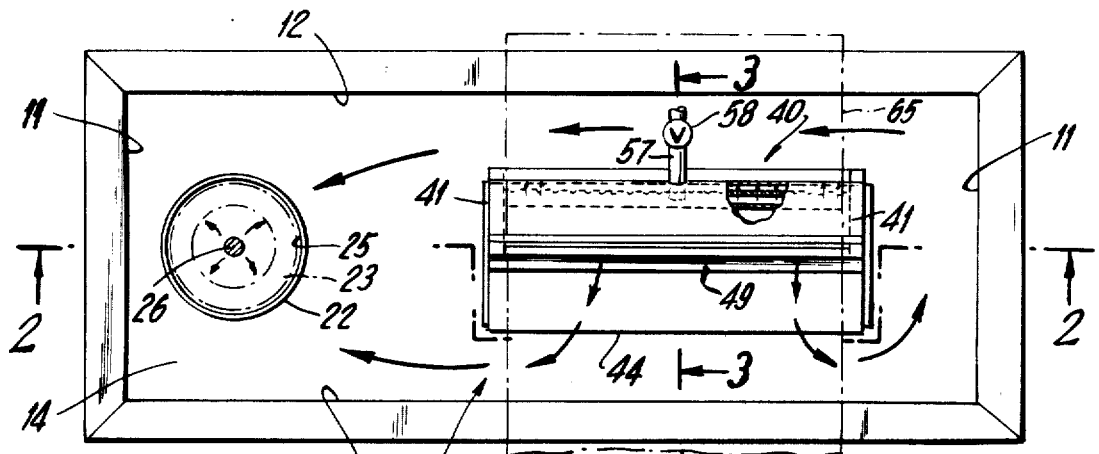
FIG. 1 is a top plan view of pretinning and soldering apparatus embodying the invention.

In the drawing, the invention is illustrated, solely exemplarily, as applied to a wave soldering machine generally of the type shown and described in Tardoskegyi U.S. Pat. No. 3190527, issued June 22, 1965, although the principles of the invention are applicable equally to other types of so-called "wave soldering" machines or apparatus.

Figure 2:
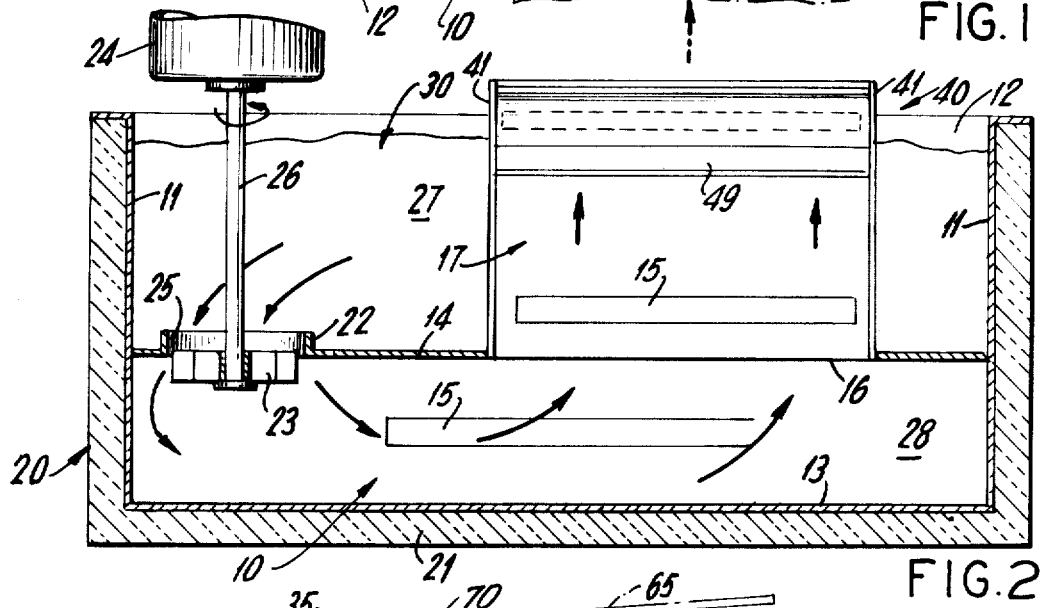
FIG. 2 is a vertical sectional view taken on the line 2—2 of FIG. 1.
Figure 3:
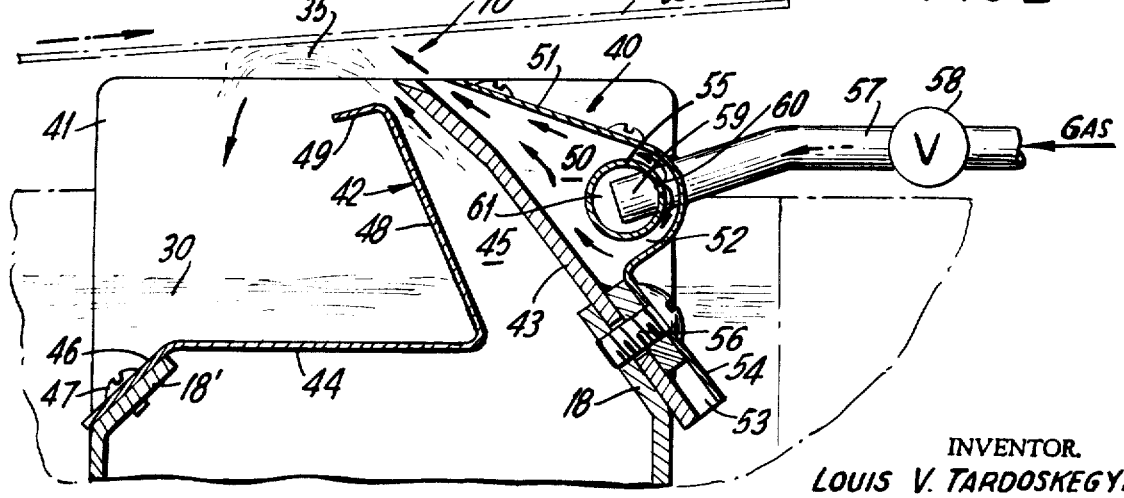
FIG. 3 is a transverse sectional view taken on the line 3—3 of FIG. 1.

Referring to FIGS. 1, 2 and 3, a solder pot or tank is indicated at 10 as having opposite end walls 11, opposite side walls 12 and a bottom wall 13. A horizontal partition 14 extends in tank or pot 10 about midway of the height of the side and end walls and, below this partition, there are disposed suitable solder heating means, such as electric resistance coils 15, to melt the solder in tank 10 and to maintain the solder continuously molten during operation of the apparatus.

Partition 14 is formed with a relatively elongated and substantially rectangular aperture 16 extending from adjacent the right hand end of the solder pot, as viewed in FIGS. 1 and 2, to about the center of the pot. A riser or upflow channel 17, of substantially rectangular cross section, is substantially congruent with opening 16 and extends upwardly therefrom to a point somewhat short of the upper edges of side and end walls 11 and 12, respectively, of solder tank or pot 10. Additional heaters, again in the form of electric resistance coils 15, are disposed in channel 17. The upper ends of the longer side walls of riser 17 terminate in inwardly and upwardly sloping flanges 18 and 18', with flange 18 being somewhat longer than flange 18'. It will be noted that the side and end walls 11 and 12, and the bottom wall 13, are enclosed in heat insulating material generally indicated at 21 and forming part of an outer casing 20.

Adjacent the left hand end of solder part 10, as viewed in FIGS. 1 and 2, partition 14 is formed with a circular opening 25 surrounded by an upstanding rim 22. A pump rotor 23 is disposed at least partly in opening 25 and is driven by a motor 24 through the medium of a drive shaft 26. Motor 24 may be supported in any suitable manner.

As mentioned in Tardoskegyi U.S. Pat. No. 3,190,527, partition 14 divides solder tank 10 into an upper section 27 and a lower or heater section 28. Pump impeller 23 circulates molten solder from upper section 27 into lower section 28 through opening 25, thus increasing the pressure in lower section 28 so that solder flows upwardly through riser or channel 17. The molten solder, generally indicated at 30, is thereby caused to flow outwardly through a nozzle assembly 40 to form a standing solder wave 35. The solder returns into that portion of upper section 27 exterior to riser 17 and is then circulated by pump impeller 23 back into lower section 28, so that the molten solder is continuously recirculated. In lower section 28 and in riser 17, the solder is maintained at a uniform temperature by heaters 15. Variations in the height of solder wave 35 may be attained by adjusting the rate of operation of motor 24 driving pump impeller 23.

Nozzle assembly 40 includes a solder nozzle 45 and an inert gas nozzle 50, the nozzle assembly comprising a pair of side plates 41 which serve not only as lateral enclosures for the nozzle assembly but also as guide means for printed circuit boards which are to be passed over solder wave 35. Plates 41 are substantially rectangular and constitute the end walls of riser or channel 17. Solder nozzle 45 is substantially rectangular in cross section, and decreases in cross sectional area from its entrance to its exit. This solder nozzle is defined by a pair of plates 42 and 43, with plate 43 also constituting one wall of inert gas nozzle 50.

The other wall of inert gas nozzle 50 is constituted by a plate 51 which converges, in the direction of gas flow, toward plate 43. Intermediate its ends, plate 51 is curved to define a trough or recess 52, and extends substantially normal toward plate 43. Plate 51 is then bent parallel to plate 43 to overlie a spacer 53, as indicated at 54, and studs 56 clamp portion 54 against spacer 53 which in turn clamps wall 43 against flange 18 of riser or channel 17, studs 56 being threaded into flange 18.

The plate 42, forming one wall of solder nozzle 45, is bent intermediate its ends to extend substantially horizontally, as indicated at 44, and is then bent downwardly to form a sloping portion 46 which overlies flange 18', of channel 17, and which is secured to flange 18' by suitable studs 47 threaded into flange 18'. Wall 42 of solder nozzle 45 slopes upwardly and forwardly, considered in the direction of the flow of molten solder, from wall portion 44, and terminates in an exit wall portion 49 which slopes downwardly and forwardly.

In so far as the formation of solder wave 35 is concerned, the pump impeller 23 creates a pressure in tank section 28 forcing solder to flow upwardly through riser 17 to be discharged through solder nozzle 45 in the form of the standing solder wave 35, after which the overflow from wave 35 passes back into the molten solder recirculating path.

Nozzle 50 is supplied with inert gas through a conduit 57 provided with a control valve 58, conduit 57 being connected to a suitable source of inert gas under pressure. The discharge end of conduit 57 extends into the interior of a gas distributing pipe 55 mounted in the trough or recess portion 52 of wall 51 of inert gas nozzle 40. The opposite end walls of pipe 55 are sealed by end members 61 which are preferably welded thereto. It will be noted that pipe 55 is spaced from trough or recess portion 52 of wall 51, and pipe 55 is formed with a plurality of discharge apertures 60 extending longitudinally therealong in closely spaced relation. For example, pipe 55 may be formed with ⅛ inch diameter apertures 60 spaced three-eighths of an inch apart. The axes of apertures 60 extend substantially parallel to the axis of the discharge end 59 of conduit 57 disposed inside pipe 55. Also, the gas is discharged through apertures 60 toward the bottom of the trough or recess 52, so that the discharged gas flows around the pipe 55 and then outwardly through nozzle 50.

The apparatus of the invention operates in a manner which will now be described. As motor 24 is energized to rotate in pump impeller 23, a standing wave of solder 35 appears above the discharge end of solder nozzle 45, the molten solder being continuously recirculated. The solder wave 35 is a one-sided standing wave of molten solder having a substantially smooth outer surface. As the solder wave 35 appears at the discharge end of solder nozzle 45, valve 58 is opened and the inert gas flows into pipe 61 for discharge through apertures 60. The inert gas then flows out of inert gas nozzle 50 to cover solder wave 35 to exclude air or oxygen therefrom.

A conventional printed circuit board conveyor carries printed circuit boards, such as 65, over and in contact with solder wave 35. As the forward edge of a printed circuit board 65 emerges rearwardly of standing solder wave 35, a wedge shaped space 70 develops between the right side of wave 35, as illustrated in FIG. 3, and a board 65. Nozzle 50 discharges inert gas, in continuous flow, into the wedge-shaped space or volume 70, so that the inert gas covers solder wave 35, the bottom surface of printed circuit board 65, and flows outwardly all around the front and side edges of printed circuit board 65. Thus, not only is the surface of standing wave 35 of molten solder protected by the inert gas, but also the pretinned or soldered undersurface of printed circuit board 65 is also covered by inert gas, thus excluding air and inhibiting oxidation. The flow of inert gas can be readily adapted to the operating conditions of the wave soldering apparatus, by suitable manipulation of valve 58.

The description of the invention as utilized with a wave soldering apparatus of the type shown in Tardoskegyi U.S. Pat. No. 3,190,527 is exemplary only, as will be readily understood, and the principles of the invention can be readily adapted to any other form of wave soldering apparatus, whether the apparatus uses a single-sided standing wave of molten solder or a double-sided standing wave of molten solder.

While a specific embodiment of the invention has been shown and described in detail, to illustrate the application of the principles of the invention, it will be understood that the invention may be embodied otherwise without departing from such principles.

What is claimed is:

1. A method of pretinning and soldering relatively flat workpieces, such as printed circuit boards, comprising the steps of maintaining a relatively wide and laterally confined stream of molten solder rising upwardly to overflow at its upper end to form a standing wave of molten solder having an upper surface which is gently curved in a direction parallel to a work travel direction; recirculating the molten solder continuously; and, during such recirculation, continuously directing a vertically confined wide jet of inert gas under pressure over the full width of the exposed surface of the standing wave of molten solder to cover such surface to exclude air therefrom to inhibit oxidation thereof.

2. A method of pretinning and soldering, as claimed in claim 1, including the step of moving a flat workpiece in the work travel direction with its undersurface in contact with the standing wave; and supplying, to the space defined between the surface of the wave and the workpiece undersurface leaving the wave, the inert gas under pressure to further exclude air from the solder coated undersurface of the workpiece to inhibit oxidation thereof.

3. A method of pretinning and soldering relatively flat workpieces, as claimed in claim 2, in which the standing wave of molten solder is a one-sided wave overflowing in a direction opposite to the direction of workpiece travel; the inert gas under pressure being discharged in a direction parallel to the direction of overflow of the standing wave of molten solder.

4. A method of pretinning and soldering relatively flat workpieces, as claimed in claim 2, including the step of regulating the flow of inert gas in accordance with the rate of recirculation of the molten solder.

5. Apparatus for pretinning and soldering relatively flat workpieces, such as printed circuit boards, comprising, in combination, a heated solder pot arranged to contain and maintain a body of molten solder therein; an upwardly extending nozzle having its lower end in communication with said solder pot; circulating means operable to cause molten solder to flow upwardly through said nozzle to overflow at the upper end of said nozzle to form a standing wave of molten solder having an upper surface which is gently curved in a direction parallel to a work travel direction, with the solder overflowing from the wave being recirculated through said solder pot and upwardly through said nozzle; and nozzle means arranged for connection to a source of inert gas under pressure and operable to direct a vertically confined wide jet of inert gas over the full width of at least the exposed surface of said standing wave of molten solder to exclude air therefrom to inhibit oxidation thereof.

6. Apparatus for pretinning and soldering relatively flat workpieces, as claimed in claim 5, in which said nozzle means comprises an inert gas nozzle juxtaposed with the solder nozzle and having its discharge end adjacent the discharge end of the solder nozzle.

7. Apparatus for pretinning and soldering relatively flat workpieces, as claimed in claim 6, in which said inert gas nozzle is superposed with the solder nozzle, the two nozzles having one wall in common.

8. Apparatus for pretinning and soldering relatively flat workpieces, as claimed in claim 6, including a gas pipe extending transversely of said inert gas nozzle upstream of the discharge end thereof; and an inert gas supply conduit extending into said inert gas nozzle and communicating with said gas supply pipe; said gas supply pipe being formed with a plurality of relatively small apertures for discharge of inert gas therefrom into said inert gas nozzle for discharge from the latter.

9. Apparatus for pretinning and soldering relatively flat workpieces, as claimed in claim 8, in which said gas pipe has closed and sealed ends; said inert gas supply conduit communicating with said gas pipe intermediate the ends of said gas pipe; said apertures being aligned longitudinally of said gas pipe.

10. Apparatus for pretinning and soldering relatively flat workpieces, as claimed in claim 9, in which said inert gas nozzle is defined, in part, by inner and outer spaced walls which converge toward the discharge end of said inert gas nozzle; said outer wall being formed with a longitudinally extending recess having an arcuate cross section; said gas pipe extending longitudinally of said recess and being in spaced relation to said outer wall; said apertures discharging inert gas toward the bottom of said recess for flow around said gas pipe toward the discharge end of said inert gas nozzle.

11. Apparatus for pretinning and soldering relatively flat workpieces, as claimed in claim 8, including a flow control valve in said inert gas supply conduit adjustable to control the flow of inert gas to said inert gas nozzle.

* * * * *